United States Patent
Selvanesan et al.

(10) Patent No.: US 11,870,631 B2
(45) Date of Patent: Jan. 9, 2024

(54) DURATION OF SHORTENED SEMI-PERSISTENT SCHEDULED INTERVALS

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Cornelius Hellge, Berlin (DE); Roya Ebrahim Rezagah, Berlin (DE); Robin Thomas, Berlin (DE); Thomas Wirth, Berlin (DE); Thomas Schierl, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 498 days.

(21) Appl. No.: 17/097,003

(22) Filed: Nov. 13, 2020

(65) Prior Publication Data
US 2021/0067396 A1 Mar. 4, 2021

Related U.S. Application Data

(63) Continuation of application No. PCT/EP2019/062835, filed on May 17, 2019.

(30) Foreign Application Priority Data

May 18, 2018 (EP) .................................. 18173279

(51) Int. Cl.
*H04L 27/26* (2006.01)
*H04W 4/40* (2018.01)
(Continued)

(52) U.S. Cl.
CPC ...... *H04L 27/2636* (2013.01); *H04L 27/2607* (2013.01); *H04W 4/40* (2018.02); *H04W 72/0446* (2013.01); *H04W 72/535* (2023.01)

(58) Field of Classification Search
CPC .. H04L 27/2636; H04L 27/2607; H04W 4/40; H04W 72/0446; H04W 72/1257; H04W 72/042
See application file for complete search history.

(56) References Cited

U.S. PATENT DOCUMENTS

2010/0150091 A1* 6/2010 Yu ........................ H04W 72/23
370/329
2012/0314627 A1* 12/2012 Choi ..................... H04W 72/21
370/280
(Continued)

FOREIGN PATENT DOCUMENTS

WO 2017166260 A1 10/2017

OTHER PUBLICATIONS

3GPP TR 22.886 V15.1.0, Study on enhancement of 3GPP Support for 5G V2X Services, Sep. 2017.
(Continued)

*Primary Examiner* — Tejis Daya
(74) *Attorney, Agent, or Firm* — McClure, Qualey & Rodack, LLP

(57) ABSTRACT

A user equipment, UE, for a wireless communication network, performs Semi-Persistent Scheduled, SPS, transmissions of messages using SPS, e.g., data or control messages, in the wireless communication network with a certain SPS interval and during a certain SPS overall time duration. The UE selects the certain SPS overall time duration for the certain SPS interval from one of a plurality of sets of SPS overall time durations, each set including a plurality of SPS overall time durations.

18 Claims, 7 Drawing Sheets

(51) Int. Cl.
*H04W 72/0446* (2023.01)
*H04W 72/50* (2023.01)

(56) References Cited

U.S. PATENT DOCUMENTS

| | | | | |
|---|---|---|---|---|
| 2013/0163532 A1* | 6/2013 | Anderson | ............. | H04L 5/0053 370/329 |
| 2014/0198699 A1* | 7/2014 | Makharia | ............. | H04W 72/04 370/311 |
| 2017/0026942 A1* | 1/2017 | Vajapeyam | ........... | H04W 72/04 |
| 2019/0132818 A1* | 5/2019 | Yasukawa | ............. | H04W 72/02 |
| 2019/0306911 A1* | 10/2019 | Hahn | .................... | H04W 72/20 |
| 2020/0280961 A1* | 9/2020 | Lee | ......................... | H04W 4/40 |

OTHER PUBLICATIONS

3GPP, Report of 3GPP TSG RAN WG2 meeting #101bis, Apr. 2018.
3GPP Technical Document—R2-1804358, OPPO, "Latency reduction in eV2x", Sanya, China, RAN2#101bis, Apr. 2018.
3GPP TS 36.212 V14.4.0, Multiplexing and channel coding, Sep. 2017.
3GPP TS 36.213 V14.4.0, Physical channels and modulation, Sep. 2017.
3GPP TS 36.321 V14.4.0, Medium Access Control (MAC) protocol specification, Sep. 2017 3GPP TSG-RAN WG2 Meeting #99.
Corrections to resource reservation for random selection in TS 36.321 GATT R2; R2-1708057, Berlin, Germany, Aug. 21-251, 2017.
International search report and written opinion, dated Aug. 7, 2019, from PCT/EP2019/062835.

* cited by examiner

DURATION OF SHORTENED SEMI-PERSISTENT SCHEDULED INTERVALS

CROSS-REFERENCES TO RELATED APPLICATIONS

This application is a continuation of copending International Application No. PCT/EP2019/062835, filed May 17, 2019, which is incorporated herein by reference in its entirety, and additionally claims priority from European Application No. EP 18 173 279.3, filed May 18, 2018, which is incorporated herein by reference in its entirety.

The present invention concerns the field of wireless communication networks or systems, more specifically, wireless communication networks in which a user equipment is configured with semi-persistent scheduling (SPS). Embodiments concern vehicular communication systems, e.g. V2X, as in the context of cellular (e.g. 3G, 4G, 5G, or future) or ad-hoc communication networks. Further embodiments concern selecting a duration for SPS transmissions from a plurality of available duration sets or ranges for a specific SPS interval, e.g., for implementing SPS transmissions for V2X Mode 3 or V2X Mode 4 user equipments or UEs.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$.

The base stations are provided to serve users within a cell. The term base station, BS, refers to as gNB in 5G (New Radio—NR) networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols. The frame structure may be in accordance with LTE or in accordance with 5G/NR, the latter supporting, e.g., multiple different types of subcarrier spacing and the use of carrier bandwidth parts.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM), orthogonal time frequency space modulation (OTFS) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In mobile communication networks, for example in networks like those described above with reference to FIG. 1, like a LTE or 5G/NR network, there may be UEs that communicate directly with each other over one or more side link (SL) channels, e.g., using the PC5 interface. UEs that communicate directly with each other over the side link may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs but may comprise any of the above mentioned devices. Such devices may also communicate directly with each other (D2D communication) using the SL channels.

When considering two UEs directly communicating with each other over the side link, both UEs may be served by the same base station, i.e., both UEs may be within the coverage area of a base station, like one of the base stations depicted in FIG. 1. This is referred to as a "in coverage" scenario. In accordance with other examples, both UEs that communicate over the side link may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in a RRC connected state. Yet another scenario is called a "partial coverage" scenario, in accordance with which one of the two UEs which communicate with each other over the side link, is served by a base station, while the other UE is not served by the base station. In each of the above-mentioned scenarios, the UEs and/or the BS should have knowledge about the resources to be used for the side link communication among the UEs.

FIG. 2 shows a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the side link. This configuration is also referred to as a mode 3 configuration.

FIG. 3 shows a scenario in which the UEs are not in coverage of a base station, i.e., the respective UEs directly communicating with each other are not connected to a base station (although they may be physically within a cell of a wireless communication network). Three vehicles 206, 208 and 210 are shown directly communicating with each other over a side link, e.g., using the PC5 interface. The scheduling and/or interference management of the V2V traffic is based on algorithms implemented between the vehicles. This configuration is also referred to as a mode 4 configuration.

The initial vehicle-to-everything (V2X) specification was included in Release 14 of the 3GPP standard. The scheduling and assignment of resources have been modified according to the V2X requirements, while the original device-to-device (D2D) communication standard has been used as the basis of the design. Cellular V2X has been agreed to operate in two configurations from a resource allocation perspective—mode 3 and mode 4. The vehicles may also transmit the messages in one of two ways—either in regular intervals over a duration of time, which is called Semi-Persistent Scheduled (SPS) transmissions, or only once at a single instance, called One Shot (OS) transmissions.

The V2X mode 3 configuration involves the scheduling and interference management of resources by the base station (BS/eNB/gNB) for vehicular UEs within the coverage of the said BS to enable sidelink (SL) (vehicle-to-vehicle (V2V)) communications. The control signaling, which defines whether the transmission is SPS or OS and the respective interval and duration for SPS, is provided to the UE over the Uu interface (via downlink control indicator (DCI)) and is dynamically assigned by the base station. The V2X mode 4 configuration for SL communications is autonomously performed using distributed (de-centralized) algorithms among UEs based on a pre-configured resource configuration. UEs autonomously determine the interval and duration respectively for SPS transmissions.

Existing V2X vehicles (mode 3 or mode 4) transmit semi-persistent messages at intervals of 20 ms, 50 ms, 100 ms up to 1000 ms. The duration as to how long these messages are sent is defined by the BS in the case of mode 3 UEs. For mode 4 UEs, the duration is defined based on a set of formulae depending on the semi-persistent interval selected.

New 5G based systems have to handle fully automated driving scenarios where messages between the UEs supporting V2X have semi-persistent messages sent between vehicles with a maximum end-to-end latency of 1 ms, 3 ms [1], 5 ms or 10 ms. However, there is a problem in that a repeated transmission of messages having such short intervals may cause increased resource utilization, thereby flooding the system with a large number of messages.

It is noted that the information in the above section is only for enhancing the understanding of the background of the invention and therefore it may contain information that does not form known technology that is already known to a person of ordinary skill in the art.

SUMMARY

An embodiment may have a user equipment, UE, for a wireless communication network, wherein the UE is configured to perform Semi-Persistent Scheduled, SPS, transmissions of messages using SPS, e.g., data or control messages, in the wireless communication network with a certain SPS interval and during a certain SPS overall time duration, and wherein the UE is configured to select the certain SPS overall time duration for the certain SPS interval from one of a plurality of sets of SPS overall time durations, each set including a plurality of SPS overall time durations.

Another embodiment may have a wireless communication system including: one or more inventive UEs, and one or more base stations.

Another embodiment may have a method for Semi-Persistent Scheduled, SPS, transmissions in a wireless communication network, the method having the steps of: performing, by a UE, Semi-Persistent Scheduled, SPS, transmissions of messages, e.g., data or control messages, using SPS with a certain SPS interval and during a certain SPS overall time duration, and selecting, by the UE, for the certain SPS interval the certain SPS overall time duration from one of a plurality of sets of SPS overall time durations, each set including a plurality of SPS overall time durations.

Another embodiment may have a non-transitory digital storage medium having a computer program stored thereon to perform the method for Semi-Persistent Scheduled, SPS, transmissions in a wireless communication network, the method having the steps of: performing, by a UE, Semi-Persistent Scheduled, SPS, transmissions of messages, e.g., data or control messages, using SPS with a certain SPS interval and during a certain SPS overall time duration, and selecting, by the UE, for the certain SPS interval the certain SPS overall time duration from one of a plurality of sets of SPS overall time durations, each set including a plurality of SPS overall time durations, when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
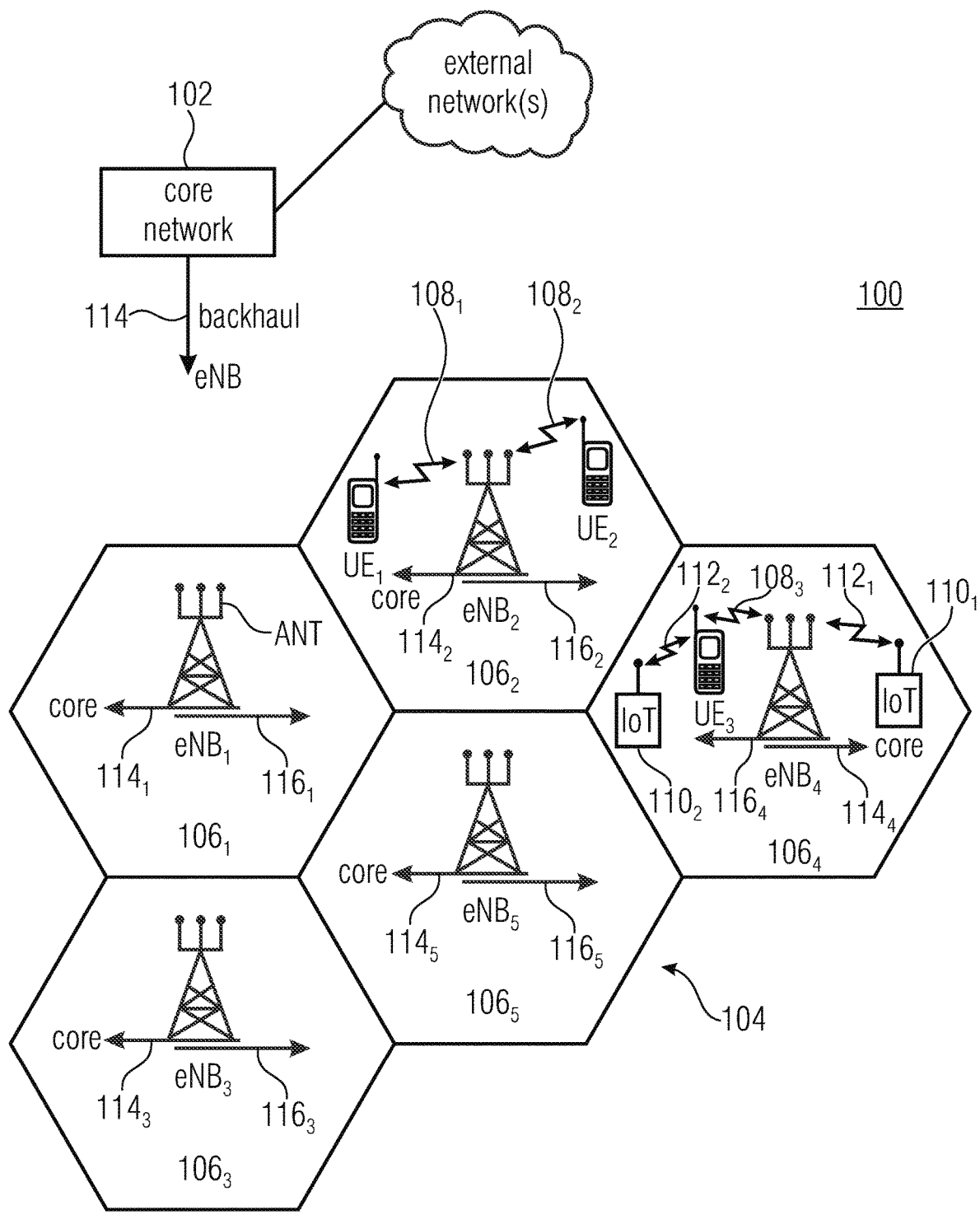
FIG. 1 shows a schematic representation of an example of a wireless communication system.
Figure 2:
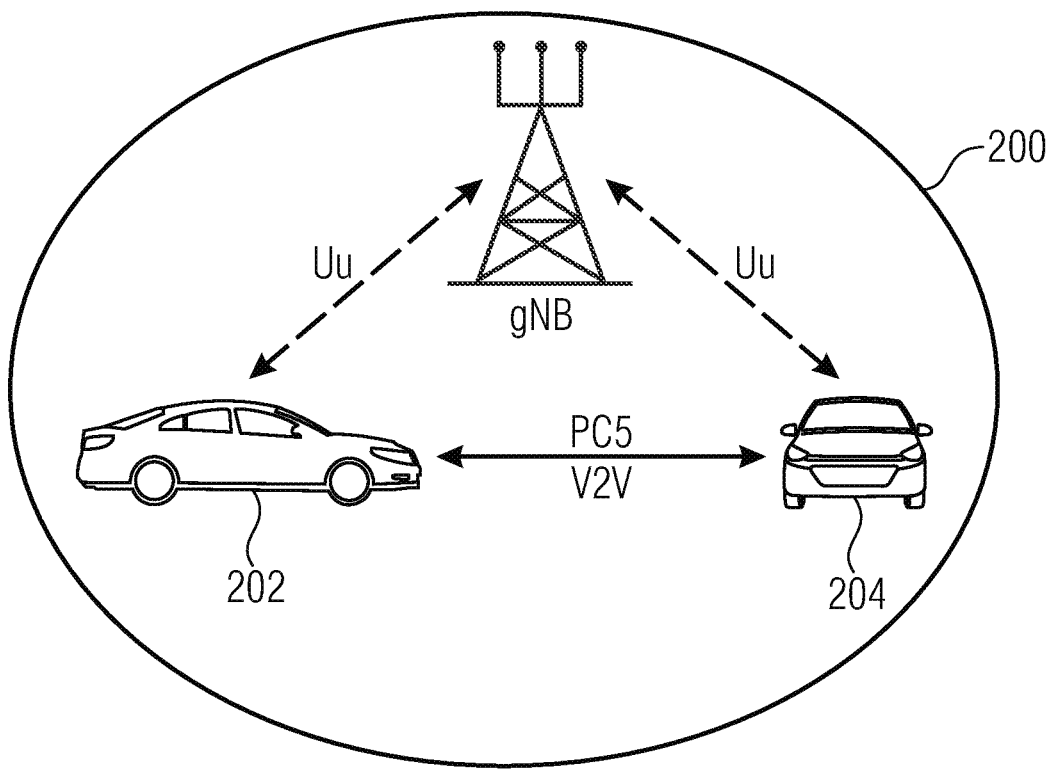
FIG. 2 shows a schematic representation of a situation in which UEs directly communicating with each other are in coverage of a base station.
Figure 3:
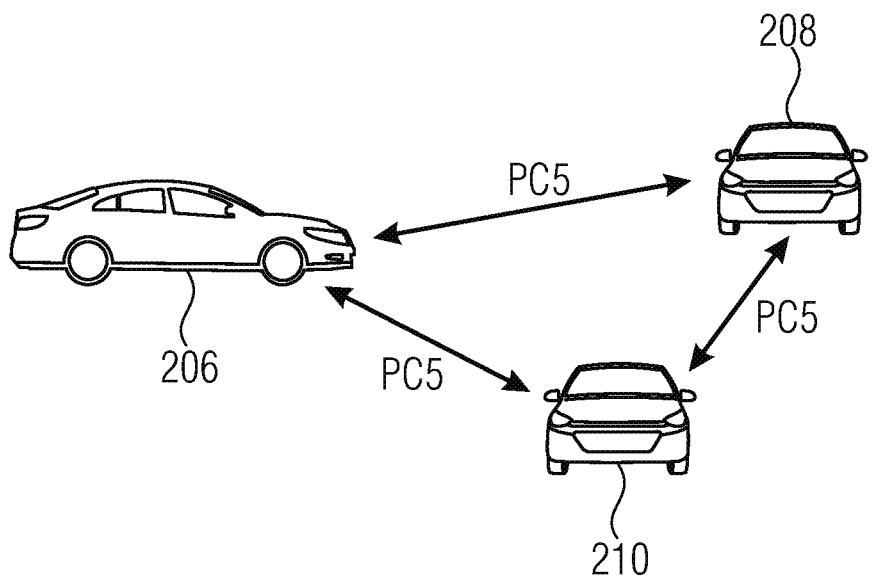
FIG. 3 shows a scenario in which UEs directly communicating with each other are not are not in coverage of a base station, i.e., are not connected to a base station.

Embodiments of the present invention is now described in more detail with reference to the accompanying drawings in which the same or similar elements have the same reference signs assigned.

As mentioned above, UEs of a wireless communication system may directly communicate with each other using the sidelink, which is also referred to as device-to-device (D2D) communication, a vehicle-to-vehicle (V2V) communication or a vehicle-to-everything (V2X) communication using SPS. In the following, aspects of the inventive approach will be described mainly with reference to V2V or V2X communications, however, the inventive approach is not limited to such scenarios and is equally applicable to other communications using the side link, e.g., to D2D communications or communications using the uU link.

Currently 3GPP discussions are underway in order to arrive at a decision to select new shorter SPS intervals for UEs in Rel. 15. RAN2 had agreed in the meeting in Sanya (RAN2#101b) [2], that an SPS interval of 10 ms shall be considered among a set of shorter intervals of 1 ms, 3 ms, 5 ms and 10 ms [3]. The shorter intervals are to enable very low end-to-end latency, especially in the case of fully automated driving [1]. This is in addition to already existing intervals of 20, 50, 100, 200, 300, 400, 500, 600, 700, 800, 900 and 1000 ms.

The interval may be defined in the Sidelink Control Information (SCI) format 1, which is sent from the transmitter to every receiver, under the parameter "Resource Reservation Field" [4]. The interval is called $P_{SPS}$ for mode 3 UEs and $P_{rsvp\_TX}$ for mode 4 UEs. For frequency division duplex (FDD) systems, $P_{rsvp\_TX}$ is also equal to $P'_{rsvp\_TX}$. For time division duplex (TDD) systems, $P_{rsvp\_TX}$ may be multiplied by a factor, e.g. $P_{step}/100$, where $P_{step}$ depends on the TDD duty cycle. The time duration as to how long messages will be transmitted in the said interval is defined by the BS in mode 3 and by the UE in mode 4. The subsequent description will mainly refer to how the mode 4 UEs may select a SPS time duration $P_{rsvp\_TX}$. However, the present invention is not limited to such embodiments, rather, the teachings described herein may be equally applied to any other UE transmitting messages using SPS, e.g., mode 3 UEs.

Based on the selected interval $P_{rsvp\_TX}$, the total number of times a mode 4 UE will transmit messages with the said interval is defined by a resource reselection counter, $C_{resel}$, as defined in [5]. Once this counter is reached it may decide out of three options:

1. the UE may decide as to whether it wants to continue transmitting messages with the said interval, or
2. the UE may decide on a new interval, or
3. the UE may stop sending SPS messages as such.

This counter is based on the parameter SL_RESOURCE_RESELECTION_COUNTER, defined in [6]. The relation between the parameter SL_RESOURCE_RESELECTION_COUNTER and the parameter $C_{resel}$ is given as follows [5]:

$$C_{resel} = 10 \times SL\_RESOURCE\_RESELECTION\_COUNTER$$

The parameter SL_RESOURCE_RESELECTION_COUNTER provides the UE with a range of values to select based on the interval. The relation between the interval and the said parameter is given in Table 1 below:

TABLE 1

Relation between SPS Interval and Reselection Counter [6].

| $P_{rsvp\_TX}$ | SL_RESOURCE_RESELECTION_COUNTER | $C_{resel}$ |
| --- | --- | --- |
| >=100 ms | [5 15] | [50 150] |
| 50 ms | [10 30] | [100 300] |
| 20 ms | [25 75] | [250 750] |

The UE is permitted to randomly select any value within the prescribed range for the reselection counter, for a defined interval [6].

Based on these parameters, the overall time duration as to how long the UE will repeatedly transmit messages using SPS in the said interval is defined based on the following relation [5]:

Overall Time Duration=$(C_{resel}-1) \times P_{rsvp\_TX}$

Based on the formulae described above, the overall time duration ranges may be calculated for the different intervals $P_{rsvp\_TX}$. This is seen in Table 2 below:

TABLE 2

Relation between SPS Interval and Overall Time Duration

| $P_{rsvp\_TX}$ | Overall Time Duration in ms |
| --- | --- |
| 1000 ms | [49000 149000] |
| 100 ms | [4900 14900] |
| 50 ms | [4950 14950] |
| 20 ms | [4980 14980] |

As may be seen from Tables 1 and 2, the overall time duration varies between approximately 5 seconds up to 149 seconds, during which the mode 4 UE may transmit messages in a periodic manner at least 50 times to a maximum of 750 times, depending on the interval selected.

However, if the overall time duration and random reselection counter in the way described above is kept also for very short SPS intervals, e.g. $P_{rsvp\_TX}$=10 ms or below, the system may be flooded with thousands of messages for a duration of up to approx. 150 seconds.

The teachings described herein provide an improved approach for handling the transmission of messages using SPS with a short SPS interval so as to avoid, e.g., a flooding of the wireless communication system. In accordance with the inventive approach, when performing Semi-Persistent Scheduled, SPS, transmissions of messages using SPS, e.g., data or control messages, in the wireless communication network with a certain SPS interval and during a certain SPS overall time duration, the UE may select the certain SPS overall time duration for the certain SPS interval from one of a plurality of sets of SPS overall time durations. This allows, especially for short SPS intervals, like intervals of 1 ms, 3 ms, 5 ms and 10 ms, to define or select a duration that is adapted to the circumstances which avoid transmitting messages in shorter intervals over a longer duration of time, thereby avoiding flooding the system with messages.

Figure 4:
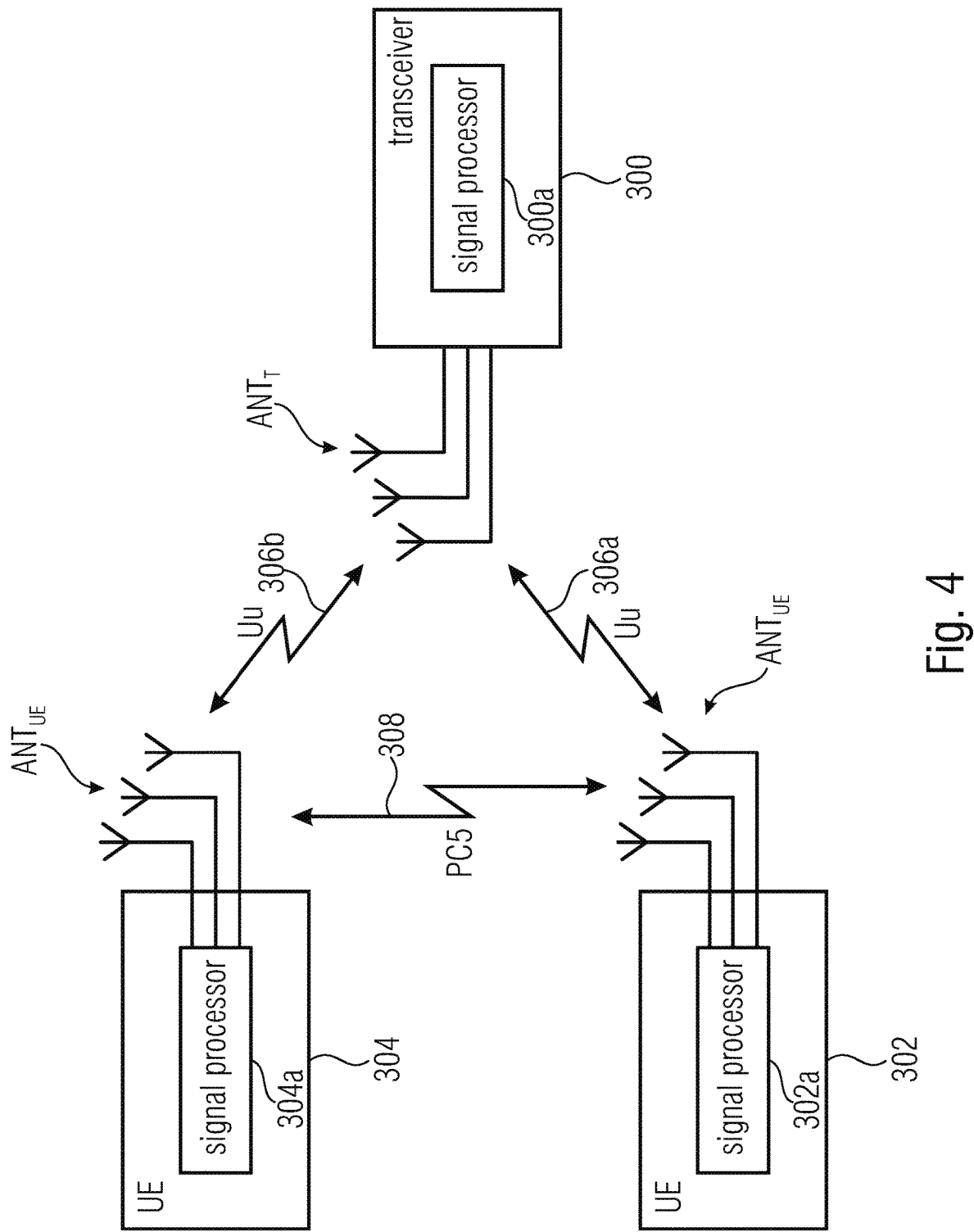
FIG. 4 is a schematic representation of a wireless communication system for communicating information including one or more transmitters, like UEs, which may operate in accordance with the inventive teachings described herein.

Embodiments of the present invention may be implemented in a wireless communication system as depicted in FIG. 1 including base stations and users, like mobile terminals or IoT devices. FIG. 4 is a schematic representation of a wireless communication system for communicating information between a transceiver 300 and a plurality of UEs 302, 304. The transceiver 300 and the UEs 302, 304 may communicate via respective first wireless communication links 306a and 306b, like a radio link using the Uu interface. Further, the UEs 302, 304 may communicate with each other via a second wireless communication link 308, like a radio link using the PC5 interface. The transceiver 300 includes one or more antennas $ANT_T$ or an antenna array having a plurality of antenna elements, and a signal processor 300a. Each of the UEs 302 and 304 includes one or more antennas $ANT_{UE}$ or an antenna array having a plurality of antenna elements, and a signal processor 302a, 304a. The respective UEs may operate in accordance with the inventive teachings described herein.

User Equipment

In accordance the first aspect, the present invention provides user equipment or UE 302 for a wireless communication network. The UE 302, e.g. using the signal processor 302a and the antenna $ANT_{UE}$, performs Semi-Persistent Scheduled, SPS, transmissions of messages using SPS, e.g., data or control messages, in the wireless communication network with a certain SPS interval and during a certain SPS overall time duration. The UE 302 selects the certain SPS overall time duration for the certain SPS interval from one of a plurality of sets of SPS overall time durations, each set including a plurality of SPS overall time durations. In other words, the UE performs SPS with a SPS interval and selects for this SPS interval the SPS duration from one of a plurality (two or more) sets of predefined SPS durations.

In accordance with embodiments,
  the UE is configured to select the certain SPS interval from a plurality of SPS intervals, each of the plurality of SPS intervals having associated therewith a plurality of sets of SPS overall time durations, and
  wherein the UE is configured to select the certain SPS overall time duration for the selected certain SPS interval from one of the associated sets of SPS overall time durations. In other words, multiple SPS intervals are available, and for each interval several sets of durations exist. One SPS interval is selected by the UE, and for the selected interval the duration is selected from one set of predefined SPS durations In accordance with embodiments, the UE is configured to randomly select the certain SPS overall time duration from the one set of SPS overall time durations.

In accordance with embodiments,
  a total number of times the UE transmits messages using SPS with the certain SPS interval is defined by one of a plurality of values of a resource reselection counter, $C_{resel}$, and the SPS overall time duration, which specifies how long the UE will repeatedly transmit the messages using SPS, is defined as follows:

SPS Overall Time Duration=$(C_{resel}-1) \times P_{rsvp\_TX}$, and the UE is configured to select for the selected SPS interval any value from a range of values of the reselection counter.

In accordance with embodiments,
a total number of times the UE transmits messages using SPS with the certain SPS interval is defined by one of a plurality of values of a resource reselection counter, $C_{resel}$, and the SPS overall time duration, which specifies how long the UE will repeatedly transmit the messages using SPS, is defined as follows:

SPS Overall Time Duration=$(C_{resel}-1) \times P_{rsvp\_TX}$, and wherein the one value of the resource reselection counter, $C_{resel}$, is based on one of a plurality of values for a parameter SL_RESOURCE_RESELECTION_COUNTER, and the relation between the parameter SL_RESOURCE_RESELECTION_COUNTER and the value of the resource reselection counter, $C_{resel}$, is given as follows:

$C_{resel}$=10×SL_RESOURCE_RESELECTION_COUNTER, and the UE is configured to select for the selected SPS interval any value from a range of values of the parameter SL_RESOURCE_RESELECTION_COUNTER.

In accordance with embodiments, the UE is configured to select the one set of predefined SPS overall time durations responsive to one or more first criteria, and/or
to select the certain SPS interval from the plurality of SPS intervals responsive to one or more second criteria, the first and second criteria being different or the same.

The one or one or more criteria may be received from higher layers.

In accordance with embodiments, the one or more criteria comprise one or more of:
one or more criteria related to safety, vehicle operations management, convenience, autonomous or remote driving, platooning, traffic efficiency and environmental friendliness, society and community,
one or more criteria related to specific situations, like a situation experienced by a vehicle, during platooning, during V2X relaying, or during autonomous or remote driving; and/or
one or more criteria related to environmental conditions, like road obstacle, person, animal or obstacle avoidance, temporary road construction, weather related conditions, accident avoidance, or traffic awareness and/or
a signaling from one or more sensors indicating a certain condition, like a pre-crash event, an accident notification, or a lane change, and/or
a signaling from an application executed by the UE, e.g., in-vehicle safety/emergency applications, or a navigation system, and/or
the occurrence of regular, non-critical information to be periodically transmitted messages; and/or
a signaling from a higher layer.

In accordance with embodiments,
the plurality of sets of SPS overall time durations includes at least a first set of SPS overall time durations and a second set of SPS overall time durations, the SPS overall time durations in the first set not exceeding a $1^{st}$ threshold, and the SPS overall time durations of the second set not falling below a $2^{nd}$ threshold, the $1^{st}$ and $2^{nd}$ thresholds being different or the same, and/or
the plurality of SPS intervals includes at least a first SPS interval and a second SPS interval, the first SPS interval being shorter than the second SPS interval.

In accordance with embodiments, responsive to recognizing an anomaly or any untoward incident in the surrounding of the UE which does not affect the UE or does not demand attention, the UE is configured to select the first SPS interval and a SPS overall time duration from the first set.

In accordance with embodiments,
the UE comprises a vehicle including one or more sensors, wherein the vehicle may be part of a platoon of vehicles or of a group of vehicles, wherein the anomaly or the untoward incident may comprise, for example, one or more of a pedestrian behaving in an erratic manner, and/or an animal hidden from plain sight, and/or temporary signboards signaling ongoing road work up ahead,
the UE is configured to broadcast the message using SPS indicative of the anomaly to one or more nearby vehicles, e.g., vehicles of the platoon or of the group, the message send using SPS being an emergency message, and
the UE is configured to recognize that the anomaly does not affect the UE in case the vehicle continues to move, and to stop the broadcast of the message using SPS once the anomaly is no longer detected.

In accordance with embodiments, responsive to recognizing an anomaly or any untoward incident in the surrounding of the UE which affects the UE or demands attention, the UE is configured to select the first SPS interval and a SPS overall time duration from the second set.

In accordance with embodiments,
the UE comprises a vehicle including one or more sensors, wherein the vehicle may be part of a platoon of vehicles or of a group of vehicles, wherein the anomaly or the untoward incident may comprise, for example, one or more of a pedestrian behaving in an erratic manner, and/or an animal hidden from plain sight, and/or temporary signboards signaling ongoing road work up ahead,
the UE is configured to broadcast the SPS message demanding assistance from one or more nearby vehicles, e.g., vehicles of the platoon or of the group, the SPS message being an emergency message, and
the UE is configured to stop the broadcast of the message once the demanded assistance has been received.

In accordance with embodiments,
the UE is configured to transmit the messages using SPS in a bursty manner by repeatedly transmitting the messages in the selected SPS intervals during an active period and stopping the transmitting of the messages during an inactive period, the active and inactive periods being both shorter than the SPS overall time duration,
wherein the active and the inactive periods have different lengths in time or the same lengths in time.

In accordance with embodiments, the UE is configured to increase and/or decrease a length of one or more of the active periods and/or one or more of the inactive periods.

In accordance with embodiments, when transmitting messages using SPS during the selected SPS overall time using a current SPS interval, the UE is configured to increase or decrease the SPS interval, while maintaining the selected SPS overall time.

In accordance with embodiments, the UE, which may be a legacy UE, is configured to
select the second SPS interval and a SPS overall time duration from the second set, implement multiple instances of the SPS transmission using the second SPS interval and the SPS overall time duration from the second set, transmit the multiple instances in a time deferred manner so that an offset between subsequent instances has a length as the first SPS interval, which may be a legacy SPS interval.

In accordance with embodiments, in case the SPS message fulfils a specific criterion, like being a high priority message, e.g., based on the Pro-Se per Packet Priority (PPPP), the UE is configured to align its SPS interval, SPS overall duration time and, if used, burst pattern with the SPS interval, SPS overall duration time and, if used, burst pattern of one or more neighboring UEs.

In accordance with embodiments, the user equipment of any one of the preceding claims, comprising one or more of:
- a mobile terminal, e.g., a terminal configured to operate in accordance with the V2X Mode 4 for a side link communication with one or more other UEs, or a terminal configured to operate in accordance with the V2X Mode 3 for a Uu link communication with a base station, or
- stationary terminal, or
- cellular IoT-UE, or
- an IoT device, or
- a ground based vehicle, or
- an aerial vehicle, or
- a drone, or
- a moving base station, or
- road side unit, or
- a building, or
- any other item or device provided with network connectivity enabling the item/device to communicate using the wireless communication network, e.g., a sensor or actuator.

System

The present invention provides a wireless communication system, comprising a one or more of the inventive UEs, and a one or more base stations.

In accordance with embodiments, the wireless communication system uses an Inverse Fast Fourier Transform, IFFT, based signal, wherein the IFFT based signal includes OFDM with CP, DFT-s-OFDM with CP, IFFT-based waveforms without CP, f-OFDM, FBMC, OTFS, GFDM or UFMC.

In accordance with embodiments, the base station comprises one or more of:
- a macro cell base station, or
- a small cell base station, or
- a road side unit, or
- a UE, or
- a remote radio head, or
- an AMF, or
- an SMF, or
- a core network entity, or
- a network slice as in the NR or 5G core context, or
- any transmission/reception point (TRP) enabling an item or a device to communicate using the wireless communication network, the item or device being provided with network connectivity to communicate using the wireless communication network.

Method

The present invention provides a method for Semi-Persistent Scheduled, SPS, transmissions in a wireless communication network, the method comprising;
- performing, by a UE, Semi-Persistent Scheduled, SPS, transmissions of messages, e.g., data or control messages, using SPS with a certain SPS interval and during a certain SPS overall time duration, and
- selecting, by the UE, for the certain SPS interval the certain SPS overall time duration from one of a plurality of sets of SPS overall time durations, each set including a plurality of SPS overall time durations.

Computer Program Product

The present invention provides a computer program product comprising instructions which, when the program is executed by a computer, causes the computer to carry out one or more methods in accordance with the present invention.

In accordance with embodiments of the present invention, a UE may choose for a SPS interval to be used for transmitting message using SPS any duration from one of a plurality of sets of duration values. The UE may select the duration according to the application, e.g. using ProSe per packet priority (PPPP), on a case by case basis.

In accordance with embodiments, for an interval of 10 ms the UE may select from seven different sets of durations, as is illustrated schematically in Table 3.

TABLE 3

Example with a fixed interval $P_{rsvp\_Tx}$ of 10 ms and possible set of durations from one of which the UE may select a duration

| $P_{rsvp\_TX}$ | SL_RESOURCE_RESELECTION_COUNTER |
|---|---|
| 10 ms | [1 5] |
| 10 ms | [1 100] |
| 10 ms | [1 150] |
| 10 ms | [5 50] |
| 10 ms | [10 150] |
| 10 ms | [50 150] |
| 10 ms | [75 150] |

In accordance with other embodiments, for different intervals of 10 ms, 5 ms, 3 ms and 1 ms, a duration may be selected for one or more respective sets of durations. Table 4 below illustrates an embodiment allowing the UE to select for a desired interval the associated duration form two sets. The sub columns—"short" and "long" indicate the actual durations in ms in the sets.

TABLE 4

Relation between different Short SPS Intervals and available sets of Short Overall Time Durations

| | | | Overall Time Duration in ms | |
|---|---|---|---|---|
| $P_{rsvp\_TX}$ | SL_RESOURCE_RESELECTION_COUNTER | | Short | Long |
| 10 ms | [1 5] | [1 100] | [90 490] | [90 9990] |
| | [5 50] | [1 150] | [490 4990] | [90 14990] |
| | [75 150] | [50 150] | [7490 14990] | [4990 14990] |
| | . . . | [10 150] | . . . | [990 14990] |
| | | . . . | | . . . |

TABLE 4-continued

Relation between different Short SPS Intervals and
available sets of Short Overall Time Durations

| | | | Overall Time Duration in ms | |
|---|---|---|---|---|
| $P_{rsvp\_TX}$ | SL_RESOURCE_RESELECTION_COUNTER | | Short | Long |
| 5 ms | [10 100] | [100 300] | [495 4995] | [4995 14995] |
| ... | ... | ... | ... | ... |
| 3 ms | [16 166] | [166 498] | [477 4977] | [4977 14937] |
| ... | ... | ... | ... | ... |
| 1 ms | [50 500] | [500 1500] | [499 4999] | [4999 14999] |
| ... | ... | ... | ... | ... |

Is it noted that in Table 4 above, for the $P_{rsvp\_TX}$ interval=10 ms the possible ranges for the parameter SL_RESOURCE_RESELECTION_COUNTER as given in Table 3 are included, together the associated actual overall time durations (which may be determined as stated above). In accordance with the depicted embodiment, in Table 4, the actual sets or ranges of overall time durations may be classified as short or long duration. In accordance with other embodiments, also for some or all or the other $P_{rsvp\_TX}$ intervals in Table 4 (5 ms, 3 ms, 10 ms) multiple ranges for parameter SL_RESOURCE_RESELECTION_COUNTER may be given together with associated with actual overall time durations.

It is noted that the specific values indicated in the tables above and indicated in the following further description are only examples. The present invention is not limited to such values or embodiments, rather, the teachings described herein may be equally applied to any other values.

In accordance with embodiments, A set of overall time durations may also be referred to as range or interval of overall time durations. A set, range or interval of overall time durations may include for example a plurality of values, like integer values, which are indicative of respective durations of overall time durations.

In accordance with embodiments, the UE may select the certain overall time duration on its own or autonomously, or responsive to an external signaling, e.g., from a base station or another UE.

In accordance with embodiments, SPS causes that respective time slots are booked during which a transmission using SPS may be carried out. The message transmitted using such a SPS configuration may be any kind of message, like a control message or data message provided, e.g. by an application running on the UE. The actual content of the message or transmission may change at every time slot; in other words, messages send at the respective SPS time slots may be the same (a repetition of a message send during an earlier time slot), may provide one or more redundancy versions of a message send during an earlier time slot, or may have different content.

In accordance with embodiments, the SPS overall time duration may also be referred to as an overall time duration, and the SPS interval may also be referred to as an interval.

In accordance with embodiments, the UE may select the one set of predefined SPS overall time durations responsive to one or more first criteria, and/or select the certain SPS interval from the plurality of SPS intervals responsive to one or more second criteria. The criteria may relate to
- safety, vehicle operations management, convenience, autonomous or remote driving, platooning, traffic efficiency and environmental friendliness, society and community, specific situations, like a situation experienced by a vehicle, during platooning, during V2X relaying, or during autonomous or remote driving; and/or
- one or more environmental conditions, like road obstacle, person, animal or obstacle avoidance, temporary road construction, weather related conditions, accident avoidance, or traffic awareness and/or
- a signaling from one or more sensors indicating a certain condition, like a pre-crash event, an accident notification, or a lane change, and/or
- a signaling from an application executed by the UE, e.g., in-vehicle safety/emergency applications, or a navigation system, and/or
- the occurrence of regular, non-critical information to be periodically transmitted messages; and/or
- a signaling from a higher layer.

In accordance with embodiments the UE may be a vehicular UE.

For example, specific situations experienced by a vehicle may include an accident, or any mechanical trouble. The UE may then can transmit the messages in short intervals over a longer duration so that, e.g., the UE may adequately warn other UEs in the vicinity about its emergency and location, and/or the UE ensures that it is heard by the relevant authorities.

For example, specific environmental conditions may comprise a UE traveling at low visibility and adverse weather conditions. When such specific environmental conditions apply, the UE may select longer intervals over a longer duration so that, e.g., the UE may warn or inform other vehicles about its location in a timely manner, as well as receive locations from other UEs without flooding the wireless system with its own messages, which may be due to the half-duplex constraint of V2X systems.

For example, specific signaling from one or more sensors may include the use of on-board Lidar, thermal, motion, acoustic or image sensors, like vehicle camera, to detect, e.g., an anomalous entity along the roadside. The anomalous entity may be a pedestrian, an animal or a temporary signboard indicating on-going construction work ahead. In this case, the UE may transmit short intervals over a shorter duration, so as to make other UEs in the vicinity aware of the imminent threat. At the same time, since the UE is passing by the said anomaly, it may transmit over a short duration as it will pass by the said anomaly in a relatively short duration while in motion. Once it passes by the said anomaly, the UE's sensors will not pick up the anomaly anymore and hence need not transmit any information regarding the said anomaly.

For example, signaling from an application may include signals from an on-board navigation system, e.g. the on-board navigation may detects an imminent traffic pile up/long queues so that the UE may transmit messages in short intervals over shorter durations. This is because once the UE is no more the last car in the traffic jam/queue, it is away from the imminent danger of a vehicle crashing into said UE.

For example, the occurrence of regular, non-critical information may cause the UE to transmit regular and non-critical but periodic messages. The UE may transmit in longer intervals and over shorter or longer durations depending on the application. The messages may be regular weather or location updates to neighboring vehicles, or vehicle diagnostic information that may be send to the vehicle manufacturer's servers.

For example, a signaling from a higher layer may be a signaling in the form of the value of a parameter from higher layers, like a flag or a trigger. This parameter for example, may be the packet priority assigned for a certain message by the higher layers. If the message is of higher priority, the UE may transmit using shorter intervals. The duration may be decided based on one of the above criteria.

Further embodiments of the present invention implementing the above describe approach of selecting a specific duration are now described in more detail.

Embodiment 1

In accordance with this embodiment a mode 4 UE may select a shorter overall time duration for a shorter intervals, when the vehicle transmitting the messages is not under duress.

For example, when a fully autonomous vehicle that is travelling detects any anomalies in its surroundings using onboard sensors, the vehicle may broadcast this message to nearby vehicles. For example, the vehicle may detect a pedestrian behaving in an erratic manner, an animal hidden from plain sight, temporary signboards signaling ongoing road work up ahead, or that any of the above described criteria may be met. Since the messages are deemed emergency messages, they are transmitted using the shorter intervals, especially if the vehicle is part of a platoon or a group of vehicles.

However, since the vehicle is still moving, it will realize the anomaly only for a short duration of time, after which it will pass the anomaly and will not have any new information regarding the same from its sensors. At this point, the vehicle may stop broadcasting this information.

In such scenarios, the vehicle or vehicular UE may use shorter durations for the shorter intervals, for example, durations for intervals as listed in Table 5.

TABLE 5

Relation between Short SPS Interval and Short Overall Time Duration

| $P_{rsvp\_TX}$ | SL_RESOURCE_RESELECTION_COUNTER | Overall Time Duration in ms |
|---|---|---|
| 10 ms | [5 50] | [490 4990] |
| 5 ms | [10 100] | [495 4995] |
| 3 ms | [16 166] | [477 4977] |
| 1 ms | [50 500] | [499 4999] |

Figure 5:
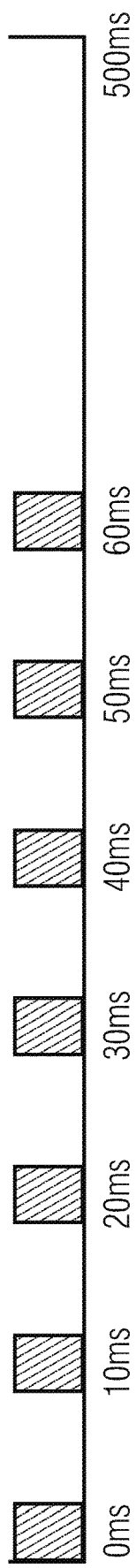
FIG. 5 is a diagrammatic representation of a scheme in accordance with an embodiment using a short interval and a short duration.

FIG. 5 is a diagrammatic representation of the scheme in accordance with embodiment 1 using a short interval and a short duration, wherein the interval is selected to be 10 ms $P_{rsvp\_TX}$ and the duration in the interval is selected from [490 4990].

Embodiment 2

In accordance with this embodiment a mode 4 UE may select a longer overall time duration for a shorter interval, when the vehicle transmitting the messages is under duress or meets with any untoward incident and demands attention.

For example, when a fully autonomous vehicle detects any anomalies while travelling and unfortunately collides with the said anomaly or detects that any untoward incident or any of the above described criteria is met and assistance is needed, the vehicle may demand assistance from nearby vehicles. In order to alert the nearby vehicles and/or any emergency vehicle in the vicinity, the vehicle in question may broadcast repeated messages in a short interval for a longer duration of time. This may be done until the vehicle has received the demanded or useful assistance.

In such scenarios, the vehicle or vehicular UE may use longer durations for the shorter intervals, for example, durations for intervals as listed in Table 6.

TABLE 5

Relation between Short SPS Interval and Long Overall Time Duration

| $P_{rsvp\_TX}$ | SL_RESOURCE_RESELECTION_COUNTER | Overall Time Duration |
|---|---|---|
| 10 ms | [50 150] | [4990 14990] |
| 5 ms | [100 300] | [4995 14995] |
| 3 ms | [166 498] | [4977 14937] |
| 1 ms | [500 1500] | [4999 14999] |

Figure 6:
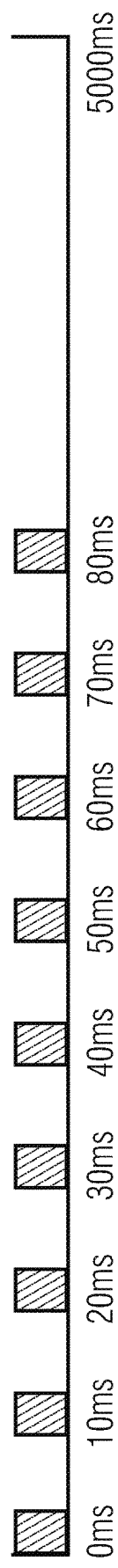
FIG. 6 is a diagrammatic representation of a scheme in accordance with an embodiment using a short interval and a long duration.

FIG. 6 is a diagrammatic representation of the scheme in accordance with embodiment 2 using a short interval and a long duration, wherein the interval is selected to be 10 ms $P_{rsvp\_TX}$ and the duration in the interval is selected from [4990 14990].

Embodiment 3

In accordance with this embodiment a mode 4 UE may select a longer overall time duration for shorter intervals, e.g. as in embodiment 2, but does not continuously transmit the messages. The UE may instead transmit the messages in a bursty manner, with the UE transmitting the messages in the short time intervals for a short period within the duration, then stop transmitting for another period, and then repeat the procedure with the same or an adapted period and duration again.

For example, autonomous vehicles transmitting messages using the shorter intervals over longer durations may continuously exhaust resources in a crowded region, say in an urban space. In order to counter this effect, the mode 4 UE may transmit messages in a bursty manner over the longer duration. An active and an inactive period may be defined which are both shorter than the overall time duration. When in the active period, the UE transmits the messages using SPS and the shorter duration, and stops transmitting in the inactive period. The UE restarts sending the messages with the same shorter interval for the active period. This process may be continued across the overall time duration, which may be selected as in embodiment 2 (see Table 5).

In accordance with other embodiments, the UE may retransmit the same message in a given active period, in the case of an emergency, e.g., to enhance the reliability of the messages being sent, especially when the vehicle is travelling at high speeds.

Figure 7:
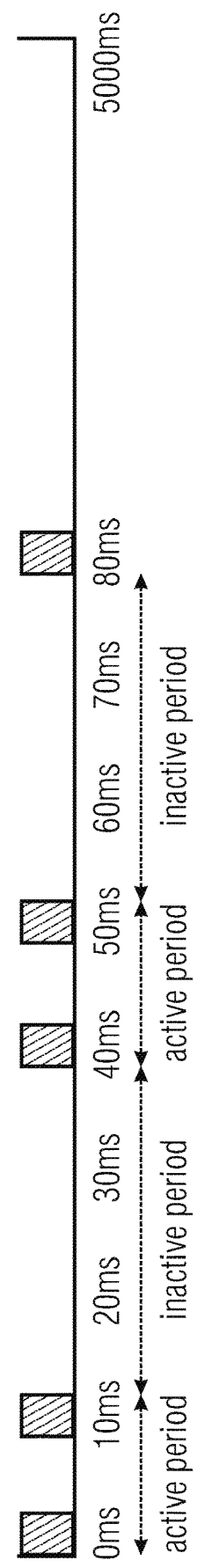
FIG. 7 is a diagrammatic representation of the scheme in accordance with an embodiment using short interval bursts, a long duration and a repeated traffic pattern a short interval and a long duration.

FIG. 7 is a diagrammatic representation of the scheme in accordance with embodiment 3 using short interval bursts, a long duration and a repeated traffic pattern a short interval and a long duration.

Embodiment 4

In accordance with this embodiment, which is similar to embodiment 3 except that the mode 4 UE, instead of stopping transmissions, may increase the interval used for transmissions in a tiered manner, while the longer overall time duration is maintained.

For example, a mode 4 UE may be transmitting continuously in a crowded region over a longer overall time duration, as defined in Table 5. In order to ensure that the resources are not exhausted, the UE may start transmitting across the longer duration using a short interval, and increase the interval length at every pre-defined interval occurrence. This makes sure that critical messages are transmitted using the shorter intervals without congesting the available resources.

Figure 8:
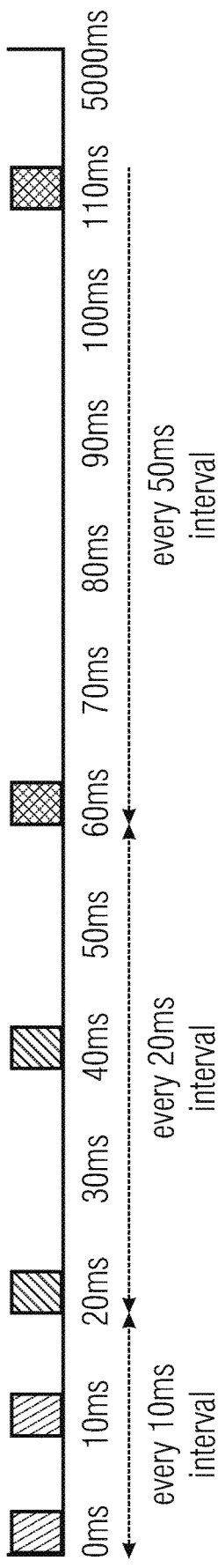
FIG. 8 is a diagrammatic representation of the scheme in accordance with an embodiment using short interval bursts and a modified burst pattern over time duration.

FIG. 8 is a diagrammatic representation of the scheme in accordance with embodiment 4 using short interval bursts and a modified burst pattern over time duration. In the depicted embodiment, initially an interval of 10 ms, is used, which increased to 20 ms and 50 ms. The overall time duration is maintained.

Embodiment 5

In accordance with this embodiment a mode 4 UE selects a longer overall time duration for longer intervals, but will transmit multiple instances using the same interval in a time deferred manner.

For example, to transfer the benefits of shorter intervals to legacy UEs which do not employ the shorter intervals, a legacy UEs may transmit the messages in a time deferred manner, over the longer overall time duration, as defined in Table 5.

When considering a mode 4 UE using a longer interval of 20 ms, the UE may transmit the first instance of the SPS at a time $t_0$ and then offset the beginning of the second instance by half of the interval length. In this case, the offset is 10 ms, and the UE transmits the second instance at $t_1=10$ ms. This will mimic the effect of a shorter interval of 10 ms to the receivers, as well as ensure that the said UE has the capability to transmit messages at shorter intervals, which may be a vital component of autonomous driving vehicles.

Figure 9:
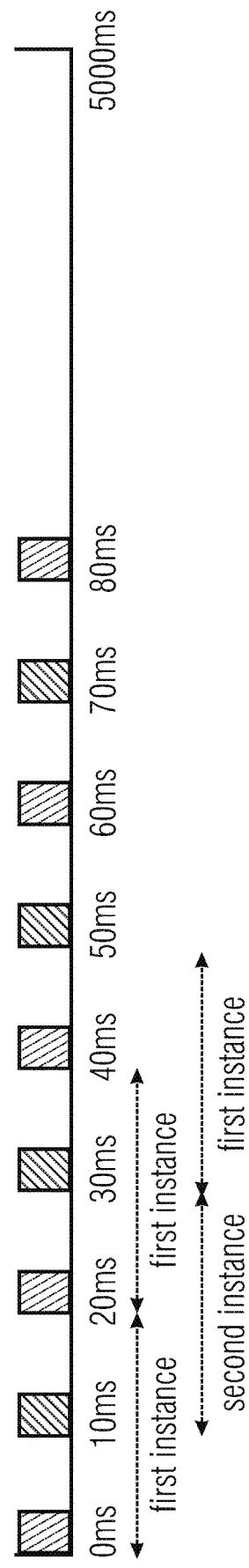
FIG. 9 is a diagrammatic representation of the scheme in accordance with an embodiment transmitting the messages in a time deferred manner.

FIG. 9 is a diagrammatic representation of the scheme in accordance with embodiment 5 transmitting the messages in a time deferred manner as described above. In the depicted embodiment, the SPS interval is 20 ms but messages are transmitted at first and second instances, the instances offset by 10 ms, thereby creating a transmit pattern that transmits messages using SPS every 10 ms. The overall time duration is maintained.

Figure 10:
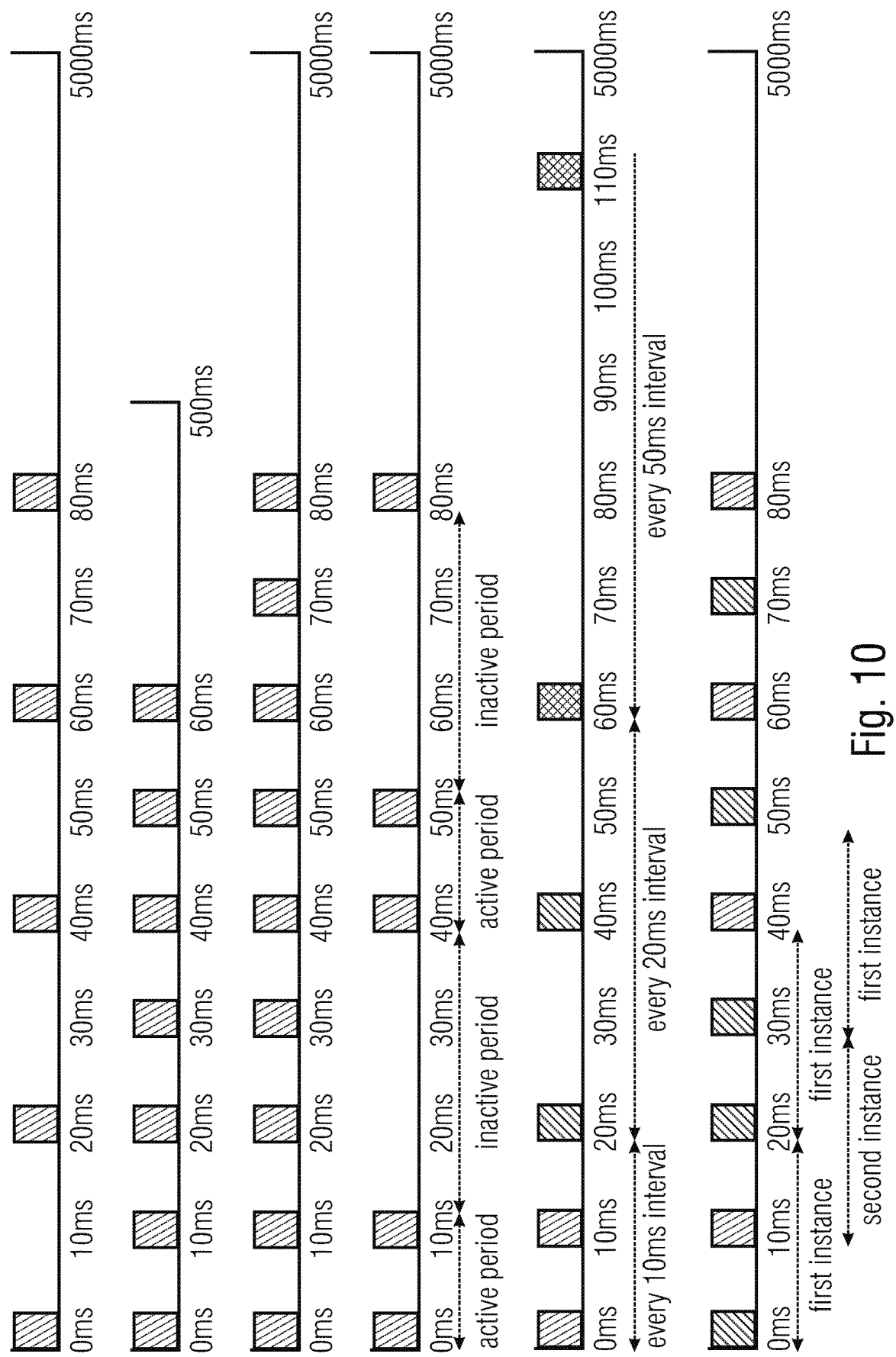
FIG. 10 is a schematic representation of a wireless communication system for communicating information between a transceiver 300 and a plurality of UEs 302, 304 operating in accordance with the present invention.

FIG. 10 illustrates a comparison of the above described embodiments 1 to 5. In accordance with embodiments, the embodiments 1 to 5 may be implemented separately from each other, and, in accordance with other embodiments, some or all of the embodiments 1 to 5 may be combined.

FIG. 10 illustrates a comparison of the above described embodiments 1 to 5. In accordance with embodiments, the embodiments 1 to 6 may be implemented separately from each other, and, in accordance with other embodiments, some or all of the embodiments 1 to 6 may be combined.

In accordance with further embodiment a plurality of UEs operating in accordance with the teachings described herein may align the interval, the duration and/or the burst patterns, as described above in embodiments 1-5, among themselves, e.g., in case messages with a very high priority are to be transmitted using SPS. This may be done in order to extend coverage of the urgent message. A UE repeating the said message may either be instructed by the network, e.g. a BS, or may—depending on received messages (SCI or learning from received traffic patterns)—automatically follow this procedure. The alignment may be done by the UE listening to the messages from other UEs or the UE may be configured via a control message from another UE/device.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
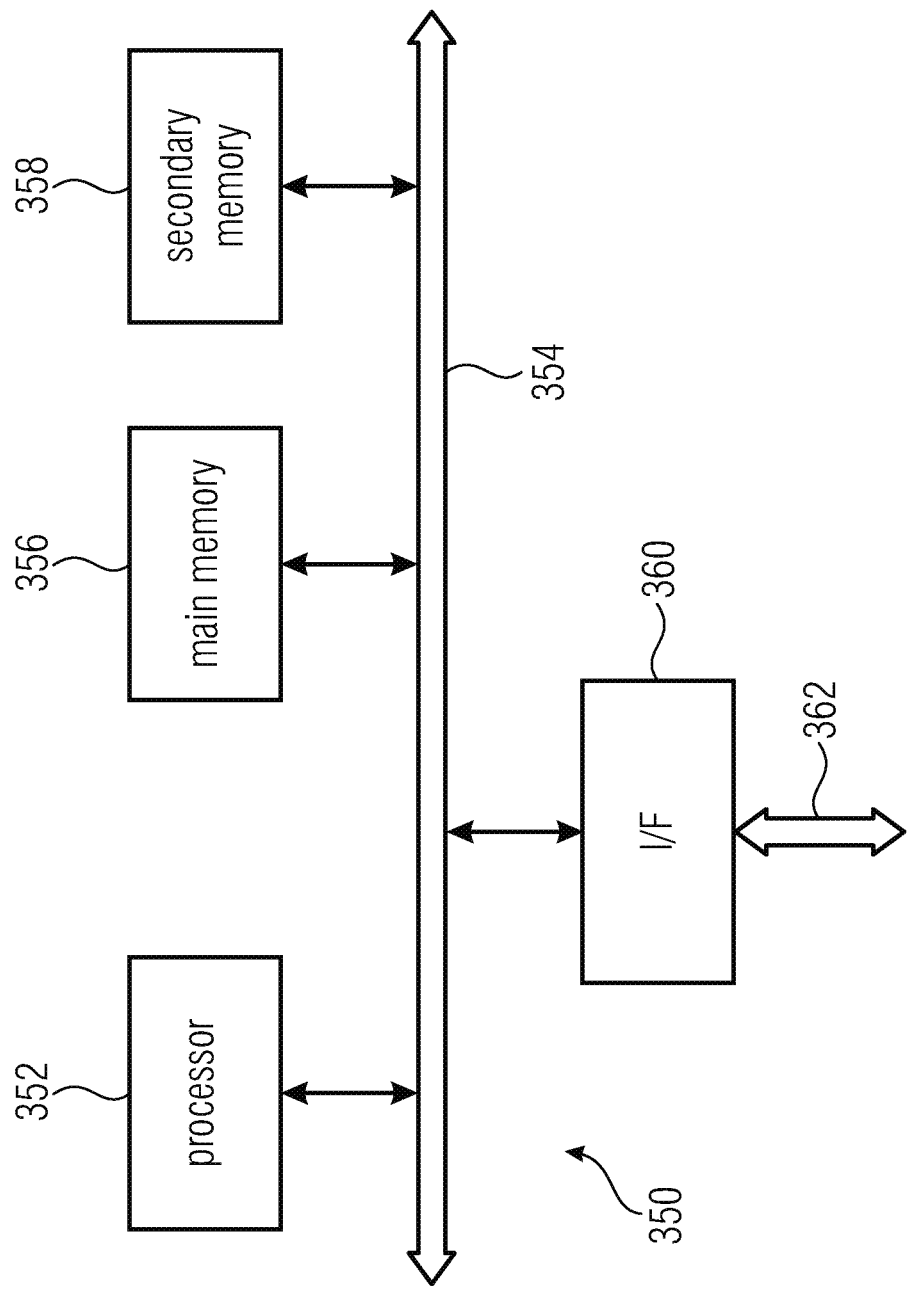
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the form electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enable the computer system 350 to implement the present invention. In particular, the computer program, when executed, enable processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 22.886 V15.1.0, Study on enhancement of 3GPP Support for 5G V2X Services, September 2017
[2] 3GPP, Report of 3GPP TSG RAN WG2 meeting #101bis, April 2018
[3] OPPO, "Latency reduction in eV2x", 3GPP Technical Document—R2-1804358, Sanya, China, RAN2#101bis, April 2018
[4] 3GPP TS 36.212 V14.4.0, Multiplexing and channel coding, September 2017

[5] 3GPP TS 36.213 V14.4.0, Physical channels and modulation, September 2017
[6] 3GPP TS 36.321 V14.4.0, Medium Access Control (MAC) protocol specification, September 2017

The invention claimed is:

1. A user equipment, UE, for a wireless communication network, the UE comprising:
  one or more antennas or an antenna array having a plurality of antenna elements, and
  a signal processor,
  wherein the UE is configured to perform Semi-Persistent Scheduled, SPS, transmissions of messages using SPS, e.g., data or control messages, in the wireless communication network with a certain SPS interval and during a certain SPS overall time duration,
  wherein the UE is configured to select the certain SPS overall time duration for the certain SPS interval from one of a plurality of sets of SPS overall time durations, each set comprising a plurality of SPS overall time durations,
  wherein the UE is configured to select the certain SPS interval from a plurality of SPS intervals, each of the plurality of SPS intervals having associated therewith a plurality of sets of SPS overall time durations, and
  wherein the UE is configured to select the certain SPS overall time duration for the selected certain SPS interval from one of the associated sets of SPS overall time durations.

2. The user equipment of claim 1, wherein the UE is configured to
  select the one set of predefined SPS overall time durations responsive to one or more first criteria, and/or
  to select the certain SPS interval from the plurality of SPS intervals responsive to one or more second criteria, the first and second criteria being different or the same.

3. The user equipment of claim 2, wherein the one or more criteria comprise one or more of:
  one or more criteria related to safety, vehicle operations management, convenience, autonomous or remote driving, platooning, traffic efficiency and environmental friendliness, society and community,
  one or more criteria related to specific situations, like a situation experienced by a vehicle, during platooning, during V2X relaying, or during autonomous or remote driving; and/or
  one or more criteria related to environmental conditions, like road obstacle, person, animal or obstacle avoidance, temporary road construction, weather related conditions, accident avoidance, or traffic awareness and/or
  a signaling from one or more sensors indicating a certain condition, like a pre-crash event, an accident notification, or a lane change, and/or
  a signaling from an application executed by the UE, e.g., in-vehicle safety/emergency applications, or a navigation system, and/or
  the occurrence of regular, non-critical information to be periodically transmitted messages; and/or
  a signaling from a higher layer.

4. The user equipment of claim 1, wherein, responsive to recognizing an anomaly or any untoward incident in the surrounding of the UE which does not affect the UE or does not demand attention, the UE is configured to select the first SPS interval and a SPS overall time duration from the first set.

5. The user equipment of claim 4, wherein
  the UE comprises a vehicle comprising one or more sensors, wherein the vehicle may be part of a platoon of vehicles or of a group of vehicles, wherein the anomaly or the untoward incident may comprise, for example, one or more of a pedestrian behaving in an erratic manner, and/or an animal hidden from plain sight, and/or temporary signboards signaling ongoing road work up ahead,
  the UE is configured to broadcast the message using SPS indicative of the anomaly to one or more nearby vehicles, e.g., vehicles of the platoon or of the group, the message send using SPS being an emergency message, and
  the UE is configured to recognize that the anomaly does not affect the UE in case the vehicle continues to move, and to stop the broadcast of the message using SPS once the anomaly is no longer detected.

6. The user equipment of claim 1, wherein, responsive to recognizing an anomaly or any untoward incident in the surrounding of the UE which affects the UE or demands attention, the UE is configured to select the first SPS interval and a SPS overall time duration from the second set.

7. The user equipment of claim 6, wherein
  the UE comprises a vehicle comprising one or more sensors, wherein the vehicle may be part of a platoon of vehicles or of a group of vehicles, wherein the anomaly or the untoward incident may comprise, for example, one or more of a pedestrian behaving in an erratic manner, and/or an animal hidden from plain sight, and/or temporary signboards signaling ongoing road work up ahead,
  the UE is configured to broadcast the SPS message demanding assistance from one or more nearby vehicles, e.g., vehicles of the platoon or of the group, the SPS message being an emergency message, and
  the UE is configured to stop the broadcast of the message once the demanded assistance has been received.

8. The user equipment of claim 1, wherein
  the UE is configured to transmit the messages using SPS in a bursty manner by repeatedly transmitting the messages in the selected SPS intervals during an active period and stopping the transmitting of the messages during an inactive period, the active and inactive periods being both shorter than the SPS overall time duration,
  wherein the active and the inactive periods comprise different lengths in time or the same lengths in time.

9. The user equipment of claim 8, wherein the UE is configured to increase and/or decrease a length of one or more of the active periods and/or one or more of the inactive periods.

10. The user equipment of claim 1, wherein, when transmitting messages using SPS during the selected SPS overall time using a current SPS interval, the UE is configured to increase or decrease the SPS interval, while maintaining the selected SPS overall time.

11. The user equipment of claim 1, wherein the UE, which may be a legacy UE, is configured to
  select the second SPS interval and a SPS overall time duration from the second set,
  implement multiple instances of the SPS transmission using the second SPS interval and the SPS overall time duration from the second set, transmit the multiple instances in a time deferred manner so that an offset between subsequent instances comprises a length as the first SPS interval, which may be a legacy SPS interval.

12. The user equipment of claim 1, wherein, in case the SPS message fulfils a specific criterion, like being a high priority message, e.g., based on the Pro-Se per Packet Priority, the UE is configured to align its SPS interval, SPS overall duration time and, if used, burst pattern with the SPS interval, SPS overall duration time and, if used, burst pattern of one or more neighboring UEs.

13. The user equipment of claim 1, comprising one or more of:
- a mobile terminal, e.g., a terminal configured to operate in accordance with the V2X Mode 4 for a side link communication with one or more other UEs, or a terminal configured to operate in accordance with the V2X Mode 3 for a Uu link communication with a base station, or
- stationary terminal, or
- cellular IoT-UE, or
- an IoT device, or
- a ground based vehicle, or
- an aerial vehicle, or
- a drone, or
- a moving base station, or
- road side unit, or
- a building, or
- any other item or device provided with network connectivity enabling the item/device to communicate using the wireless communication network, e.g., a sensor or actuator.

14. A wireless communication system comprising:
a one or more base stations that transmit and receive messages using uplink and downlink connections with one or more user equipments (UEs);
wherein each of the one or more UEs comprising:
one or more antennas or an antenna array having a plurality of antenna elements, and a signal processor, wherein a UE is configured to perform Semi-Persistent Scheduled, SPS, transmissions of messages using SPS, e.g., data or control messages, in the wireless communication network with a certain SPS interval and during a certain SPS overall time duration, and wherein the UE is configured to select the certain SPS overall time duration for the certain SPS interval from one of a plurality of sets of SPS overall time durations, each set comprising a plurality of SPS overall time durations, wherein the UE is configured to select the certain SPS interval from a plurality of SPS intervals, each of the plurality of SPS intervals having associated therewith a plurality of sets of SPS overall time durations, and wherein the UE is configured to select the certain SPS overall time duration for the selected certain SPS interval from one of the associated sets of SPS overall time durations.

15. The wireless communication system of claim 14, using an Inverse Fast Fourier Transform, IFFT, based signal, wherein the IFFT based signal comprises OFDM with CP, DFT-s-OFDM with CP, IFFT-based waveforms without CP, f-OFDM, FBMC, OTFS, GFDM or UFMC.

16. The wireless communication system of claim 14, wherein the one or base stations comprising one or more of:
- a macro cell base station, or
- a small cell base station, or
- a road side unit, or
- a UE, or
- a remote radio head, or
- an AMF, or
- an SMF, or
- a core network entity, or
- a network slice as in the NR or 5G core context, or
- any transmission/reception point enabling an item or a device to communicate using the wireless communication network, the item or device being provided with network connectivity to communicate using the wireless communication network.

17. A method for Semi-Persistent Scheduled, SPS, transmissions in a wireless communication network, the method comprising;
performing, by a UE, Semi-Persistent Scheduled, SPS, transmissions of messages, e.g., data or control messages, using SPS with a certain SPS interval and during a certain SPS overall time duration, and
selecting, by the UE, for the certain SPS interval the certain SPS overall time duration from one of a plurality of sets of SPS overall time durations, each set comprising a plurality of SPS overall time durations,
wherein the UE selects the certain SPS interval from a plurality of SPS intervals, each of the plurality of SPS intervals having associated therewith a plurality of sets of SPS overall time durations, and
wherein the UE selects the certain SPS overall time duration for the selected certain SPS interval from one of the associated sets of SPS overall time durations.

18. A non-transitory digital storage medium having a computer program stored thereon to perform, when said computer program is run by a computer, the method for Semi-Persistent Scheduled, SPS, transmissions in a wireless communication network, the method comprising;
performing, by a UE, Semi-Persistent Scheduled, SPS, transmissions of messages, e.g., data or control messages, using SPS with a certain SPS interval and during a certain SPS overall time duration,
selecting, by the UE, for the certain SPS interval the certain SPS overall time duration from one of a plurality of sets of SPS overall time durations, each set comprising a plurality of SPS overall time durations,
wherein the UE is configured to select the certain SPS interval from a plurality of SPS intervals, each of the plurality of SPS intervals having associated therewith a plurality of sets of SPS overall time durations, and
wherein the UE is configured to select the certain SPS overall time duration for the selected certain SPS interval from one of the associated sets of SPS overall time durations.

* * * * *